US006907504B2

(12) United States Patent
Burton et al.

(10) Patent No.: US 6,907,504 B2
(45) Date of Patent: Jun. 14, 2005

(54) METHOD AND SYSTEM FOR UPGRADING DRIVE FIRMWARE IN A NON-DISRUPTIVE MANNER

(75) Inventors: David Alan Burton, Vail, AZ (US); Noel Simen Otterness, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 10/208,373

(22) Filed: Jul. 29, 2002

(65) Prior Publication Data

US 2004/0019752 A1 Jan. 29, 2004

(51) Int. Cl.[7] ............................................. G06F 12/00
(52) U.S. Cl. ....................................... 711/162; 711/112
(58) Field of Search .......................... 711/111–114, 162

(56) References Cited

U.S. PATENT DOCUMENTS

| | | | |
|---|---|---|---|
| 5,297,258 A | 3/1994 | Hale et al. ................... | 395/275 |
| 5,574,851 A | 11/1996 | Rathunde ............... | 395/182.05 |
| 5,809,224 A | 9/1998 | Schultz et al. ......... | 395/182.05 |
| 6,012,123 A | 1/2000 | Pecone et al. ............... | 711/114 |
| 6,058,489 A | 5/2000 | Schultz et al. .................. | 714/7 |
| 6,182,198 B1 | 1/2001 | Hubis et al. ................. | 711/162 |
| 6,209,060 B1 * | 3/2001 | Machida ..................... | 711/114 |
| 6,240,527 B1 | 5/2001 | Schneider et al. ............. | 714/21 |
| 6,260,124 B1 | 7/2001 | Crockett et al. ............ | 711/162 |
| 6,728,833 B2 * | 4/2004 | Pruett et al. ................. | 711/114 |
| 2002/0166027 A1 * | 11/2002 | Shirasawa et al. .......... | 711/114 |
| 2003/0005354 A1 * | 1/2003 | Kalman .......................... | 714/7 |
| 2003/0212856 A1 * | 11/2003 | Nichols ....................... | 711/114 |

OTHER PUBLICATIONS

Chi Raid Solutions, www.chicorporation.com, solutions/storage/hardware/chiraidsolutions.htm, 4 pages.
CMD Titan RAID Controller, CRD–7400, CMD Technology, Inc., 2 pages.
Foraker, www.sagelec.com, cfm/view1.cfm?type=storage, 2 pages.
Tranzstor 8Xsc RAID High–performance Rugged SCSI Channel RAID Solution, www.zmicro.com, products/tranzstor–8xsc.htm, 2 pages.
ZZYZX Announces the Addition of Rocketstor 500 to Its Powerful RAID Storage Solution Line, www.zzyzx.com, info/press/announce/pr6–21–Zzyzx_RocketSTOR_500.html, 3 pages.

* cited by examiner

*Primary Examiner*—Matthew Anderson
*Assistant Examiner*—Shane Thomas
(74) *Attorney, Agent, or Firm*—Kunzler & Associates

(57) ABSTRACT

The present invention is a method and system for upgrading drive firmware on a drive within a distributed data storage system in a manner that is transparent and non-disruptive to the host system operations. The method and system allow for normal read and write operations to occur during the firmware upgrade process, even while the primary disk drive is off-line, through alteration of the controller read and write policies. A mapping file is created on a temporary storage device to reduce the necessary time period of the upgrade process. This time period is further reduced in a mirrored storage system or in a system having a spare drive, where a logging file is created to store the data diverted from the primary disk drive during the upgrade process. An advantage is the ability to maintain storage system redundancy during the upgrade process. The upgrade process in general is also simplified because the drive upgrade module is compatible with legacy equipment and may reside in the storage system controller firmware.

26 Claims, 11 Drawing Sheets

METHOD AND SYSTEM FOR UPGRADING DRIVE FIRMWARE IN A NON-DISRUPTIVE MANNER

BACKGROUND OF THE INVENTION

1. The Field of the Invention

The invention relates to the field of storage systems and more particularly to storage controller firmware for redundant disk arrays.

2. The Relevant Art

A major concern with current large-scale computer systems is the reliability of data storage within the computer systems. In response to this concern, manufacturers have produced storage systems known as redundant arrays of independent disks (RAID). Raid systems use a plurality of disk drives arranged in a manner that creates redundancy of stored data.

Two aspects of storage system reliability are of utmost importance, availability and accessibility. Data availability requires data to be stored at least on a primary drive, stored on a mirror drive, or encoded on multiple drives in order to be considered available to a host system. The data is considered more available as the number of distinct exact or encoded copies of the data is increased. Thus, availability is dependant upon redundancy.

Data accessibility addresses the capability of a host system to access available stored data by either directly retrieving the data from a primary or mirror drive or by regenerating the same data from encoded information on certain other drives or drive stripes through parity error-detecting and error-correcting codes (ECC).

Over time, it is often required to update the firmware of the individual disk drives within the array storage system. The new firmware may be used to reduce data access time, to boost disk drive performance, or to increase other aspects of reliability of the overall array storage system.

One difficulty currently experienced in conjunction with the disk drive firmware update process is a consequence of the relatively long period of time required to perform the firmware update. During the time in which the disk drive firmware is being updated, the disk drive is typically unavailable to service host I/O requests. This can be critical to mass storage systems that are designed to operate continually.

One manner in which the prior art has attempted to deal with this problem involves the use of a specialized device driver within the host system. This specialized device driver is configured to hold the host I/O commands until the controller is ready to accept the commands upon completion of the drive update. This solution poses a significant problem in that the proprietary device driver exists within the host system and is separate from the actual array storage system. Additionally, the proprietary device drivers may be incompatible with other existing (legacy) components within the storage area network (SAN) system.

An alternate attempted solution involves the use of a proprietary disk drive configured to continue accepting host I/O commands throughout the drive upgrade in a manner transparent to the user. Once again, however, the proprietary disk drives may be incompatible with other legacy components within the SAN system.

A restriction common to both prior art arrangements is that no prior knowledge of the update can be assumed on the part of non-proprietary host systems or disk drives.

Moreover, there is no guarantee of availability or accessibility of the disk drives during the disk drive firmware upgrade in non-proprietary systems and in systems comprised of both proprietary and non-proprietary components.

Therefore, what is needed is a method and system in which a storage system controller is capable of accepting and completing host I/O commands in a reliable and non-disruptive manner during a disk drive firmware upgrade process on a distributed data storage system. Such a method and system would be even more advantageous if it were compatible with legacy host systems and disk drives. Such a method and system would also be beneficial if it made allowances for individual or multiple disk drives to be upgraded simultaneously in order to decrease the overall time required to upgrade all of the drives.

OBJECTS AND BRIEF SUMMARY OF THE INVENTION

The present invention has been developed in response to the present state of the art, and in particular, in response to the problems and needs in the art that have not yet been fully solved by currently available host systems, disk drives and storage system controllers. Accordingly, it is an overall object of the present invention to provide an improved method and system for upgrading drive firmware in a non-disruptive manner that overcome many or all of the above-discussed shortcomings in the art.

To achieve the foregoing object, and in accordance with the invention as embodied and broadly described herein in the preferred embodiments, an improved storage system controller is provided and is configured to upgrade drive firmware in a non-disruptive manner.

The storage system controller is provided with a drive update module having firmware including a plurality of modules that are configured to carry out the individual steps of the upgrade process. These modules in the described embodiments include a drive update initiation module, a spare drive availability module, a spare drive update module, a temporary storage designation module, a mirror drive availability module, a read policy alteration module, a write policy alteration module, a control instructions update module, a drive rebuild module and a drive update completion module.

In one embodiment, the storage system controller is configured to allow for the simultaneous upgrade of control instructions on a plurality of primary disk drives. In another embodiment, the distributed data storage system may include multiple storage system controllers configured to work in parallel with a controller handling host system commands while another controller performs firmware upgrades on the disk drives.

The system is also preferably configured to be compatible with a variety of host servers and disk drives so that the firmware upgrade may be independent of existing hardware or software. Such independence conforms to an open storage area network market in that it allows an increased compatibility with a wider variety of other storage area network products.

In the preferred embodiment, the system allows firmware on a plurality of primary disk drives to be upgraded in parallel. However, the system may also allow for individual disk drives to be upgraded.

A method of the present invention is also presented for updating control instructions in an electronic storage device of a distributed data storage system. Upon initiation of the process, the controller performs a check to evaluate the availability of spare disk drives within the storage array. The firmware on all available spare disk drives is upgraded. In the preferred embodiment, spare disk drives that are available are designated as the temporary location for a mapping file and a logging file. The mapping file contains the sectors of the primary disk drive which have been written to during the upgrade process. The logging file contains the data diverted from the primary disk drive during the upgrade process.

In systems where no spares disk drives are located, host system cache may be used as the temporary location for the mapping file. Ins such instances, a logging file is not created. In the preferred embodiment, the temporary storage location is supplied with secondary power, such as a battery, in order to maintain system redundancy.

Once temporary storage has been designated and the appropriate mapping and logging files created, the controller determines the availability of any mirror disk drives. Such drives are typically available in RAID 1 configured distributed data storage systems or in other systems based, at least partially, on a RAID 1 array structure.

Prior to the actual firmware upgrade, the controller alters the read and write policies so that access to the primary disk drive to be upgraded is not attempted during the upgrade process for read and write operations initiated by the host system. The read policy is altered to either access parity drives and regenerate the requested data or to access mirror drives, depending on mirror drive availability. The write policy is altered to access either the logging file or mirror drives to fulfill the write operation. If neither a logging file nor a mirror disk drive is available, the write policy creates parity code and writes such code to the parity drives. In any case, the write policy also stores the intended primary disk drive write sector in the mapping file, if the mapping file is available.

In the preferred embodiment, the controller takes the primary disk drive off-line after the read and write policies have been altered, therefore restricting access to the disk drive during the upgrade process. While the disk drive is off-line, the RAID group to which it belongs is in a critical mode.

The firmware is then upgraded. After the firmware upgrade is complete, the controller rebuilds the data on the primary disk drive, restores the original write and read policies, puts the drive back on-line, and terminates the upgrade process. The rebuild step preferably includes copying the data from either the logging file or the mirror drive to the primary disk drive. If neither the logging file nor the mirror drive is available, the rebuild step includes regenerating the data from the parity drives through implementation of error-correcting code and storing that data to the primary disk drive.

In the preferred embodiment, this method is transparent to the host system and does not require manual user intervention. However, manual user intervention may be allowed before, during, or after the process in certain embodiments of the method.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
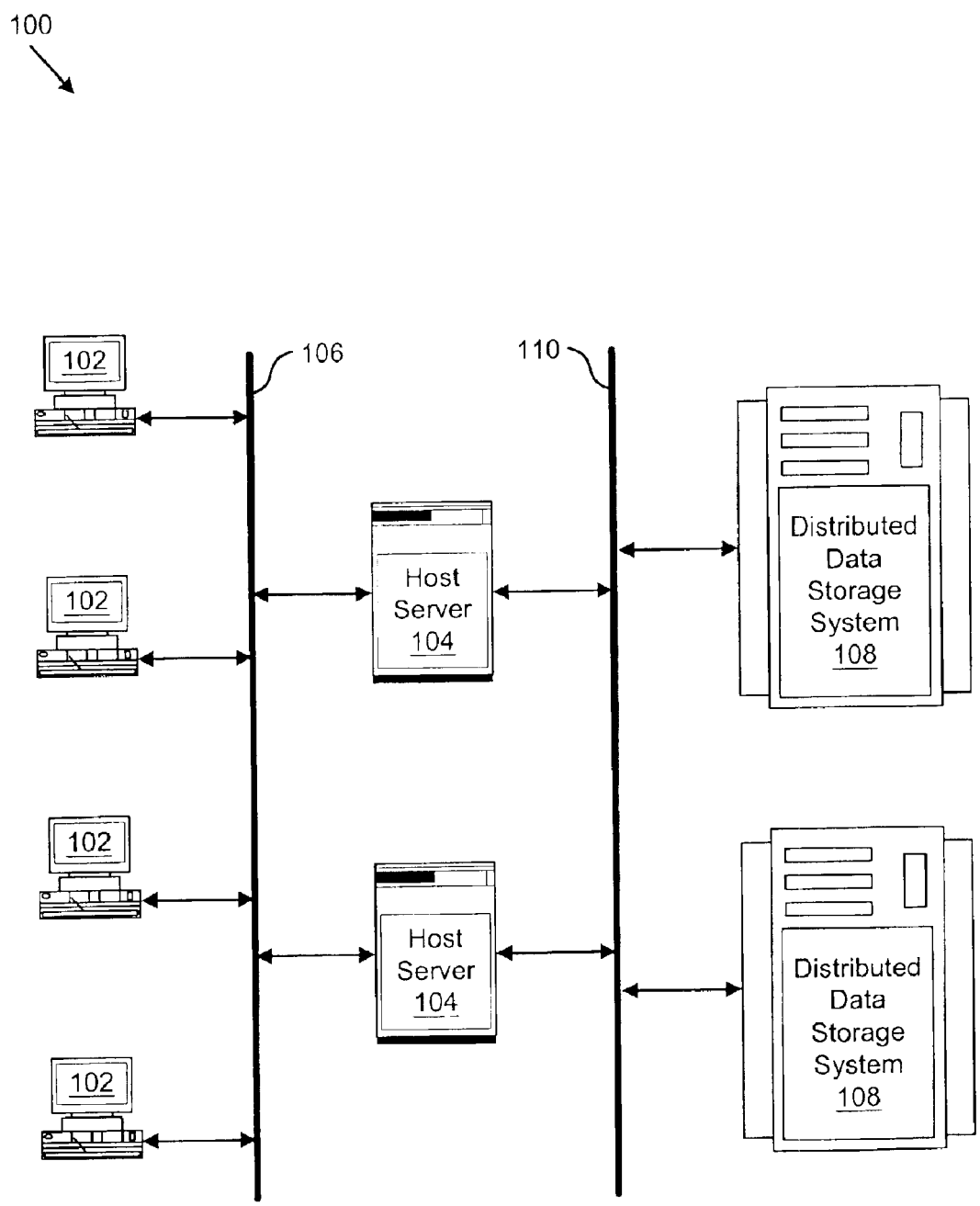
FIG. 1 is a schematic block diagram illustrating one embodiment of a representative RAID network in accordance with the present invention.

FIG. 1 shows a representative RAID network 100 suitable for use with the present invention. The RAID network 100 includes a plurality of workstations 102 and host servers 104 connected by a local area network 106. In the illustrated embodiment, the host servers 104 are connected to one or more distributed data storage systems 108 by a storage area network 110. The storage area network 110 may be embodied in either a local area network or a wide area network configuration. The host servers 104 may be connected to the distributed data storage systems 108 directly in the absence of a storage area network 110.

Figure 1A:
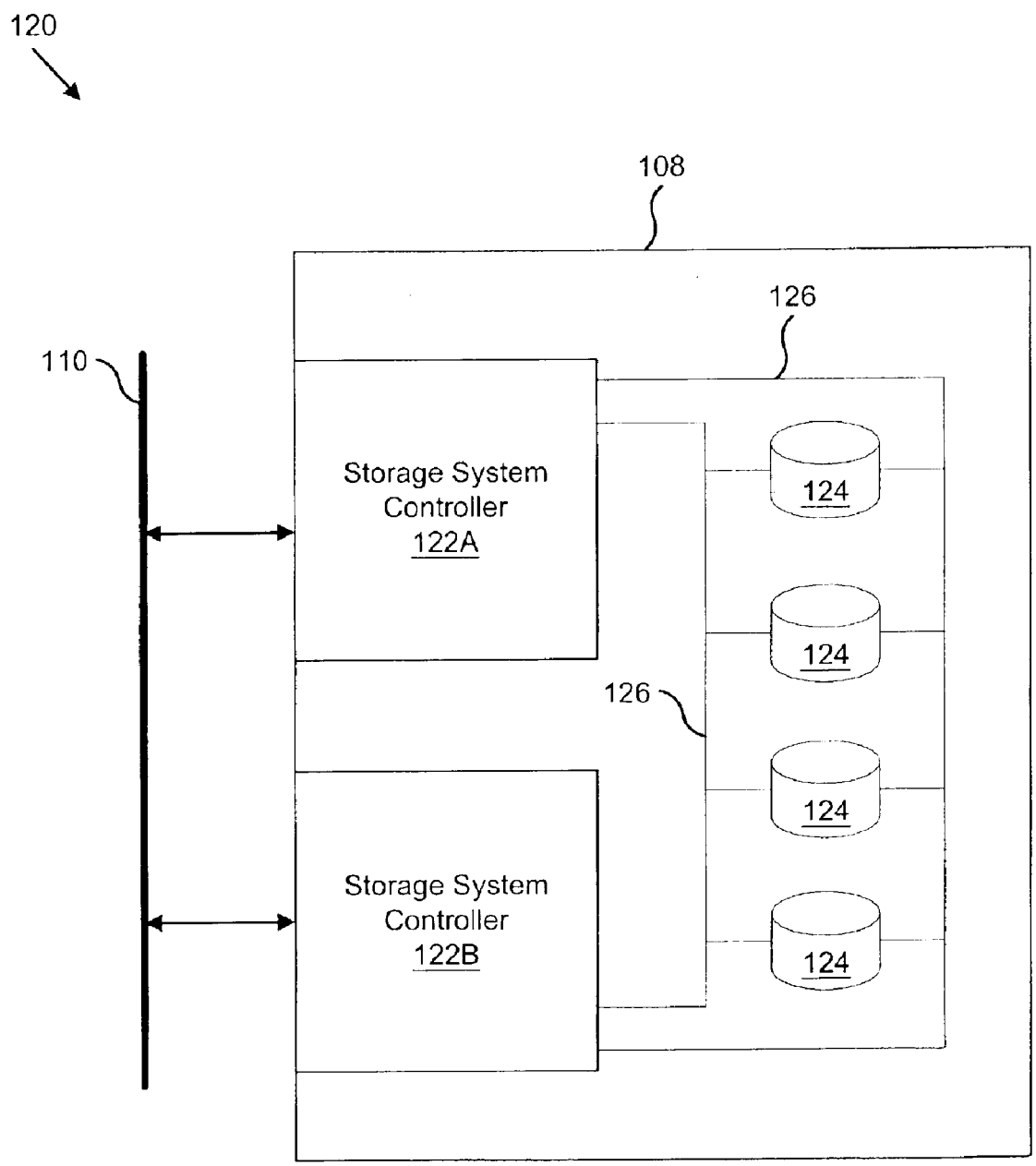
FIG. 1a is a schematic block diagram illustrating one embodiment of a representative distributed data storage system in accordance with the present invention.

FIG. 1a is a block diagram illustrating one embodiment of a distributed data storage system 120. The distributed data storage system 108 is connected to a storage area network 110 in a manner similar to that described above. The distributed data storage system 108 shown includes two storage system controllers 122A and 122B that provide redundancy against a possible failure.

Internal to the distributed data storage system 108 are a plurality of electronic storage devices 124 that are connected to the storage system controllers 122A and 122B via a drive interconnect communications channel 126.

Figure 2:
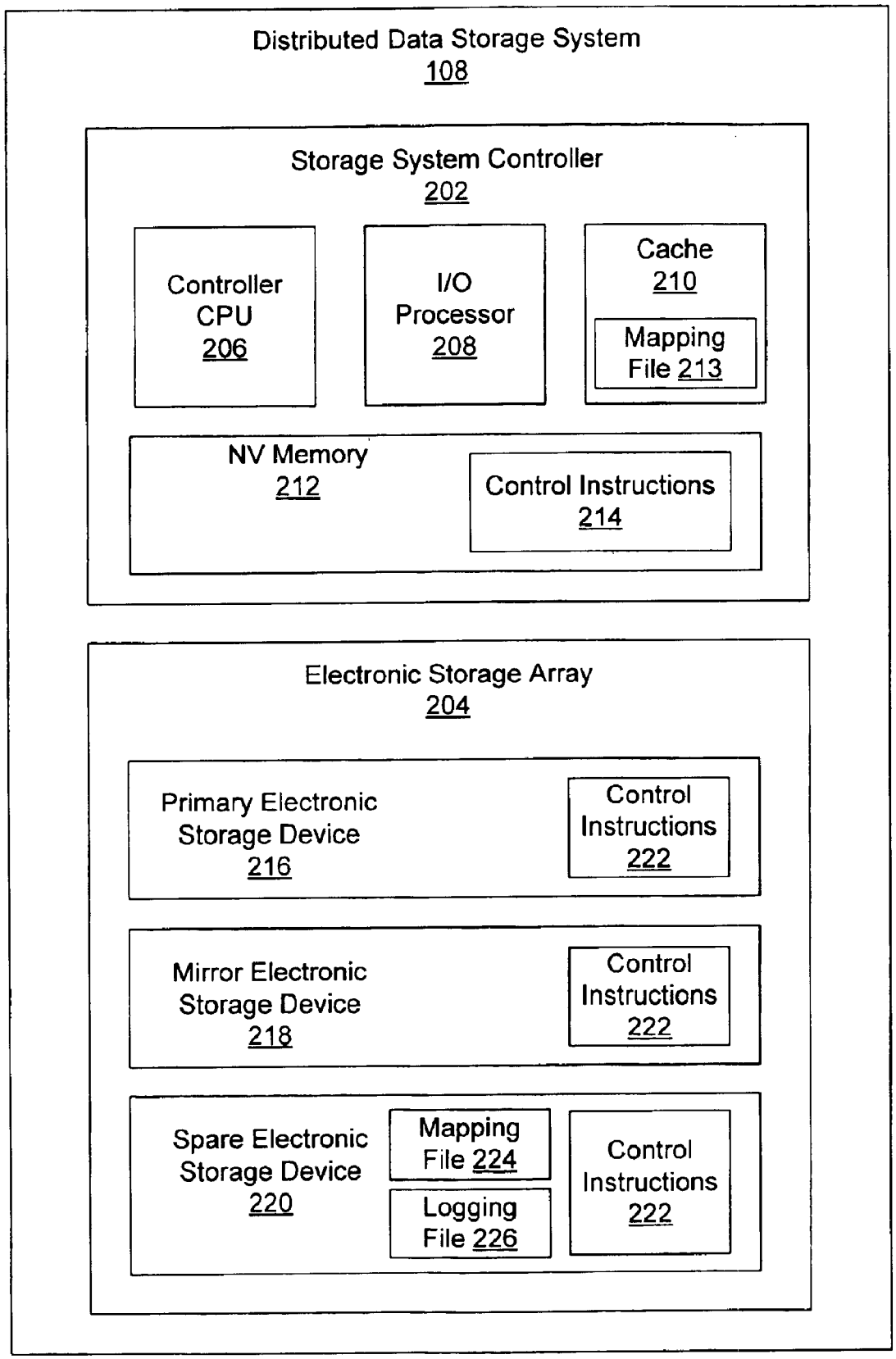
FIG. 2 is a schematic block diagram illustrating one embodiment of a representative distributed data storage system in accordance with the present invention.

FIG. 2 is a block diagram depicting one embodiment of a distributed data storage system 108 of the present invention. In the illustrated embodiment, the distributed data storage system 108 is comprised of a storage system controller 202 and an electronic storage array 204. The storage system controller 202 is similar to the storage system controllers 122A and 122B described previously. The electronic storage array 204 includes the plurality of electronic storage devices 124.

The storage system controller 202 includes a controller CPU 206, an I/O processor 208, a cache 210, and non-volatile (NV) memory 212. The cache 210 may make storage space available for a mapping file 213. The NV memory 212 includes a set of control instructions 214 that contain commands used in the control instruction update process on an electronic storage device 124.

One preferred embodiment of the electronic storage array 204 consists of one or more of each of the following electronic storage devices 124: a primary electronic storage device 216, a mirror electronic storage device 218, and a spare electronic storage device 220. Each of these electronic storage devices 124 includes a set of control instructions 222. The control instructions 222 are subject to necessary updates upon production of more efficient or more comprehensive algorithms within the control instruction set for the respective electronic storage devices 124.

The inclusion of one or more mirror electronic storage devices 218 is typical in a RAID 1 or RAID 1+0 distributed data storage system or a RAID distributed data storage system based on a RAID 1 array structure. Conversely, a typical RAID 3 or RAID 5 distributed data storage system would not include any mirror electronic storage devices 218.

The electronic storage array 204 embodiment presented includes the spare electronic storage device 220. In such a system, the spare electronic storage device 220 may make storage space available for a mapping file 224 and a logging file 226. The mapping file 224 is similar in structure to the mapping file 213.

The method and system described herein focus primarily on the update of the control instructions 222 in the primary electronic storage device 216. However, the method and system may be extended to include the update of the control instructions 222 in the mirror electronic storage device 218. Additionally, the method and system may include the update of the control instructions 222 in the spare electronic storage device 220. The manner of conducting such updates will be readily apparent from the discussion given herein.

Figure 3:
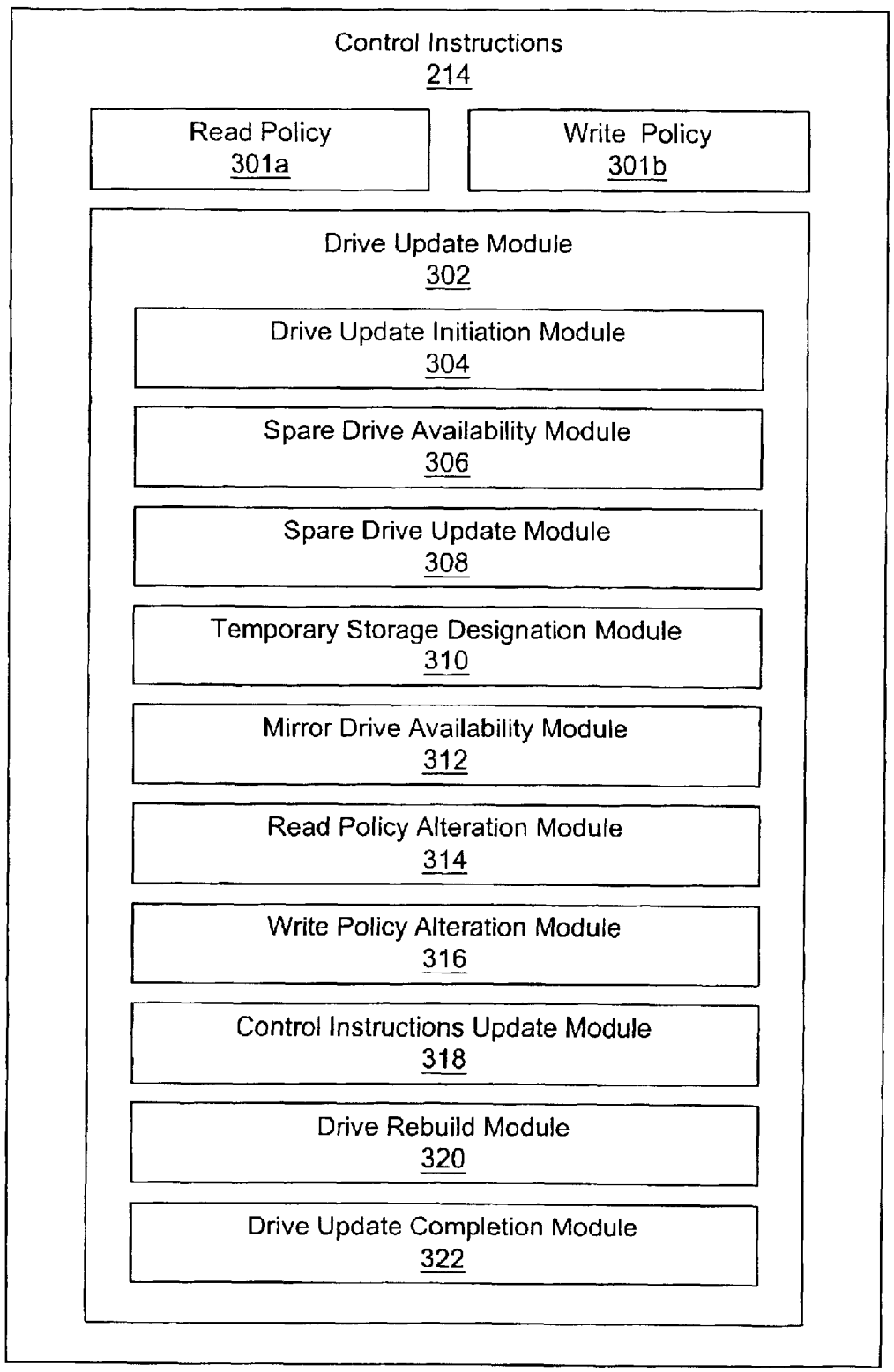
FIG. 3 is a schematic block diagram illustrating one embodiment of a representative drive update module within a typical storage system controller in accordance with the present invention.

FIG. 3 shows a schematic block diagram of one embodiment of the control instructions 214 of the storage system controller 202. These control instructions 214 preferably include a read policy 301a that designates the process through which data is retrieved from the electronic storage array 204. The control instructions 214 also preferably include a write policy 301b that designates the process through which data is written to the electronic storage array 204.

In addition to the read policy 301a and the write policy 301b, the control instructions 214 preferably include a drive update module 302. The drive update module 302 as illustrated contains a drive update initiation module 304 configured to initiate the update of the control instructions 222 in the primary electronic storage device 216.

Also included is a spare drive availability module 306 configured to determine the availability of any spare electronic storage device 220 within the electronic storage array 204. If a spare electronic storage device 220 is available, the spare drive update module 308 is configured to update the control instructions 222 in the available spare electronic storage device 220.

The depicted drive update module 302 further includes a temporary storage designation module 310 configured to designate either an available spare electronic storage device 220 or available controller cache 210 as the temporary electronic storage device during update of the control instructions 222 on the primary electronic storage device 216.

A mirror drive availability module 312 is also present and is preferably configured to determine the availability of a mirror electronic storage device 218 within the electronic storage array 204. The determination of mirror drive availability is critical to the drive update process in that a read policy alteration module 314 and a write policy alteration module 316 are implemented differently depending on the results of the mirror drive availability module 312. Some specific differences are listed below.

In general, the read policy alteration module 314 alters the read policy 301a of the storage system controller 202 so that it handles host server 104 read operations differently during the update of the control instructions 222 in the primary electronic storage device 216. Similarly, the write policy alteration module 316 alters the write policy 301b of the storage system controller 202 so that it handles host server 104 write operations differently during the update of the control instructions 222 in the primary electronic storage device 216. These alterations in the read policy 301a and write policy 301b of the storage system controller 202 cause the read and write operations to be conducted in a manner that is transparent to the host server 104 and maintains redundancy within the electronic storage array 204.

Once the drive update module 302 has concluded with the process items listed above, the drive update module 302 begins the actual update of the control instructions 222 in the primary electronic storage device 216 through implementation of a control instructions update module 318. After the control instructions 222 have been updated, a drive rebuild module 320 within the drive update module 302 rebuilds at least the data intended to be written to the primary electronic storage device 216 during the update of the control instructions 222. Upon completion of the drive rebuild module 320, a drive update completion module 322 terminates the update process.

Figure 3A:
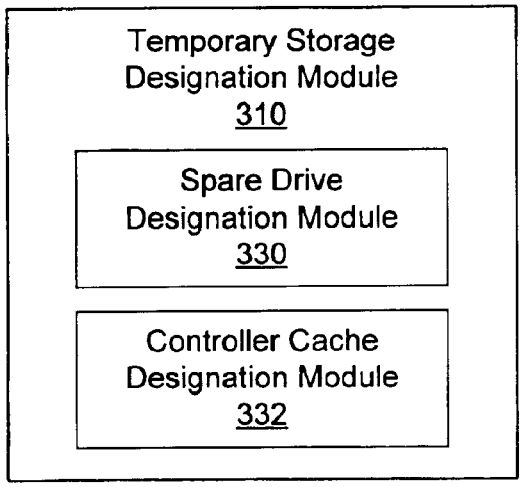
FIG. 3a is a schematic block diagram illustrating one embodiment of a representative temporary storage designation module in accordance with the present invention.

FIG. 3a shows a schematic diagram of one embodiment of the temporary storage designation module 310 that is contained in the drive update module 302. The depicted temporary storage designation module preferably contains a spare drive designation module 330 and a controller cache designation module 332.

The spare drive designation module 330 is configured to designate an available spare electronic storage device 220 as a temporary electronic storage device during the update of the control instructions 220 on the primary electronic storage device 216. The controller cache designation module 332 is configured to designate available cache in the storage system controller 202 as the temporary electronic storage device during the same update period.

Figure 3B:
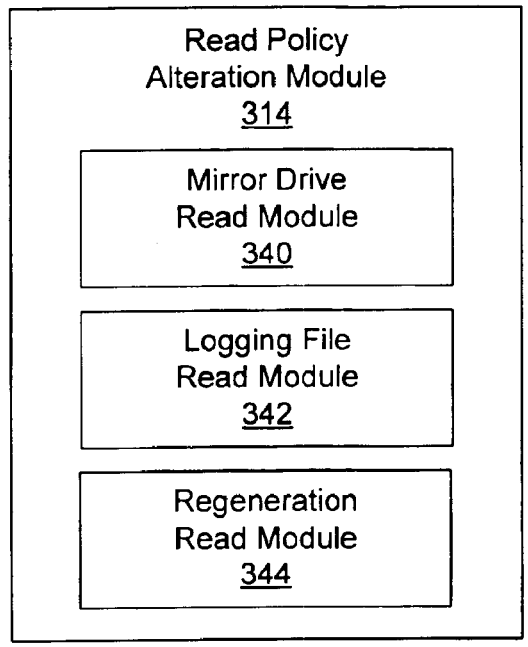
FIG. 3b is a schematic block diagram illustrating one embodiment of a representative read policy alteration module in accordance with the present invention.

FIG. 3b shows a schematic diagram of one embodiment of the read policy alteration module 314 that is contained in the drive update module 302. The depicted read policy alteration module 314 preferably contains a mirror drive update module 340, a logging file read module 342, and a regeneration read module 344.

The mirror drive update module 340 is configured to process a read operation command initiated by the host server 104 by accessing the requested data on the mirror electronic storage device 218 rather than accessing the primary electronic storage device 216. Similarly, the logging file read module 342 is configured to process a read operation command initiated by the host server 104 by accessing the requested data on a logging file located on the temporary electronic storage device rather than accessing the primary electronic storage device 216.

The regeneration read module 344 fulfills a read operation command initiated by the host server 104 in a different manner. The regeneration read module 344 accesses data on a parity electronic storage device and regenerates the requested data using error-correcting code rather than accessing the primary electronic storage device 216.

Figure 3C:
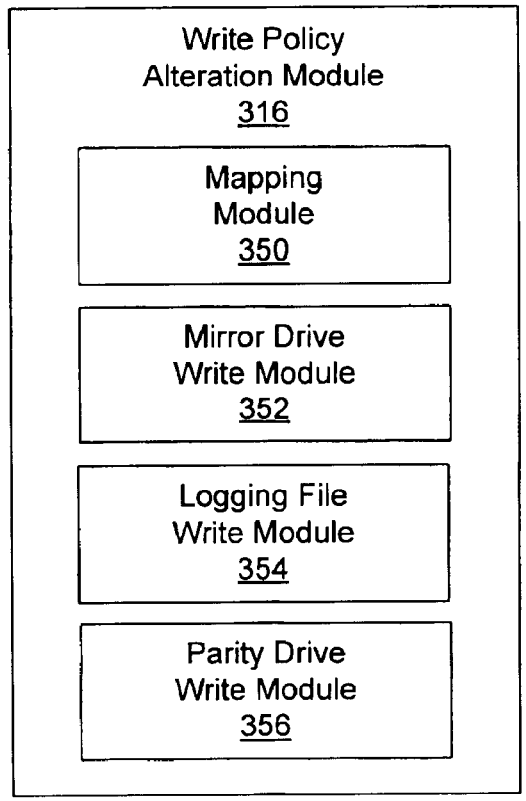
FIG. 3c is a schematic block diagram illustrating one embodiment of a representative write policy alteration module in accordance with the present invention.

FIG. 3c shows a schematic diagram of one embodiment of the write policy alteration module 316 that is contained in the drive update module 302. The depicted write policy alteration module 316 preferably includes a mapping module 350, a mirror drive write module 352, a logging file write module 354, and a parity drive write module 356.

The mapping module 350 is configured to process a write operation command initiated by the host server 104 by writing the intended sector of the primary electronic storage device 216 to which the write operation command was directed on the mapping file that is preferably located on temporary electronic storage device. The requested data to a mapping file that is preferably located on the temporary electronic storage device designated by the temporary storage designation module 310.

The mirror drive write module 352 is configured to process a write operation command initiated by the host server 104 by writing the requested data to a mirror electronic storage device 218 instead of writing the data to the primary electronic storage device 216. In a similar manner, the logging file write module 354 is configured to write the requested data to a logging file that is preferably located on a spare electronic storage device 220.

The parity drive write module 356 is configured to process a write operation command from the host server 104 by writing the appropriate error-correcting code to a corresponding parity drive located within the electronic storage array 204 rather than writing the data to the primary electronic storage device 216.

Figure 3D:
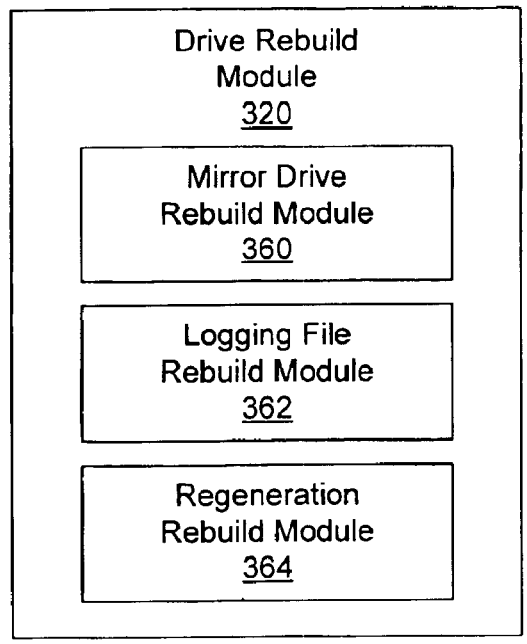
FIG. 3d is a schematic block diagram illustrating one embodiment of a representative drive rebuild module in accordance with the present invention.

FIG. 3d shows a schematic diagram of one embodiment of the drive rebuild module 320 that is contained in the drive update module 302. The depicted drive rebuild module 320 preferably contains a mirror drive rebuild module 360, a logging file rebuild module 362, and a regeneration rebuild module 364.

The mirror drive rebuild module 360 is configured to copy data written to a mirror electronic storage device 218 from the mirror electronic storage device 218 to the primary electronic storage device 216. Similarly, the logging file rebuild module 362 is configured to copy data written to a logging file located on a temporary electronic storage device from the logging file to the primary electronic storage device 216.

The regeneration rebuild module 364 is configured to write data to the primary electronic storage device 216 using error-correcting code and data on a parity drive within the electronic storage array 204.

Figure 4:
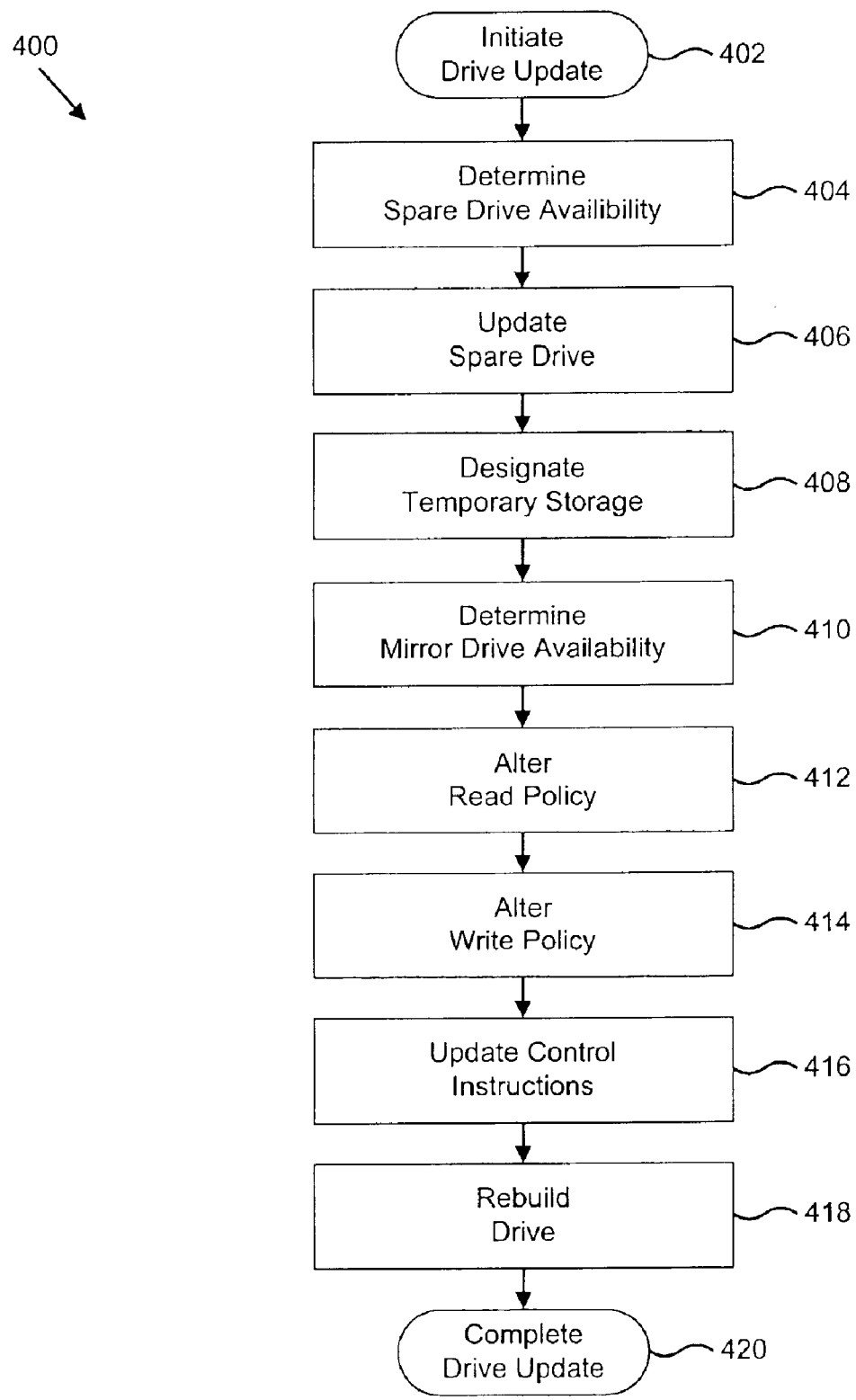
FIG. 4 is a schematic flow chart diagram illustrating one embodiment of a method for a drive update of the present invention.

FIG. 4 is a schematic flow chart diagram illustrating one embodiment of a drive update method 400. The general drive update method 400 shown may utilize the drive update module 302 of FIG. 3, but may also be conducted independently of the embodiment discussed herein with respect to the drive update module 302.

The drive update method 400 is preferably initiated by the drive update initiation module 304, as represented by a block 402. Next, the spare drive availability module 306 and the spare drive update module 308 are implemented, as indicated by a block 404 and a block 406, respectively. A block 408 depicts the designation of the temporary storage device, preferably through the use of the temporary storage designation module 310. Following the designation of the temporary storage device, the mirror drive availability module 312 determines the availability of any mirror electronic storage devices 218 within the electronic storage array 204, as represented by a block 410.

The drive update method 400 continues as the read policy 301a and write policy 301b in the storage system controller 202 are altered through implementation of the read policy alteration module 314 and the write policy alteration module 316. The read policy alteration module 314 is depicted in a block 412 and the write policy alteration module is depicted in a block 414.

Next, the control instructions 222 on the primary electronic storage device 216 are updated, as represented by a block 416, preferably through the control instructions update module 318. Following the update of the control instructions 222, the drive rebuild module 320 is implemented to rebuild the primary electronic storage device 216. This step is shown at a block 418. Finally, a block 420 represents the termination of the drive update module 302, which is preferably conducted with the drive update completion module 322.

Figure 5:
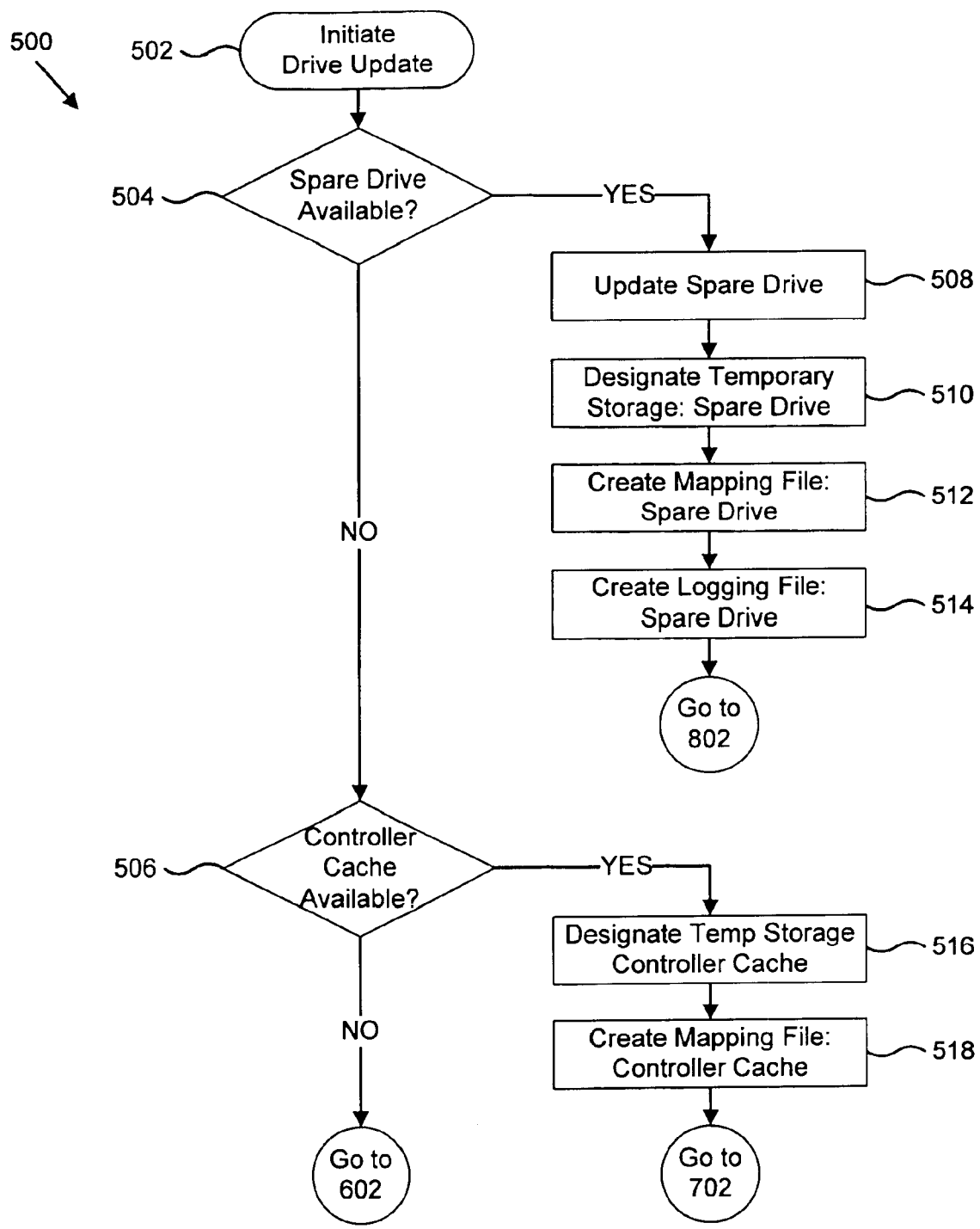
FIG. 5 is a schematic flow chart diagram illustrating a specific example of the method of FIG. 4.

FIG. 5 is a schematic flow chart diagram of a drive update method 500, which is a more specific example of a method of conducting the drive update method 400. The drive update method 500 begins with a drive update initiation, as shown at a block 502. This step is substantially similar to the step of block 402. Next, the drive update method 500 determines the availability of any spare electronic storage devices 220, as shown at a decision block 504. If no spare electronic storage devices 220 are present, the drive update method 500 determines the availability of a controller cache 210, as shown at a decision block 506. If the controller cache 210 is not available, the drive update method 500 then proceeds to step 602 of FIG. 6.

If spare electronic storage devices 220 are determined to be available at decision block 504, then the drive update method 500 updates the available spare electronic storage devices 220, as shown at a block 508. Next, the spare electronic storage device 220 is designated as the temporary electronic storage device, as shown at a block 510. The drive update method 500 proceeds to create the mapping file 224, as represented at a block 512, and the logging file 226, as represented at a block 514, in the spare electronic storage devices 220. The drive update method 500 then proceeds to step 802 of FIG. 8.

If the controller cache 210 is determined to be available at decision block 506, then the drive update method 500 designates the controller cache 210 as the temporary electronic storage device, as indicated at a block 516, after which the mapping file 213 is created, as shown by a block 518. The mapping file 213 is preferably substantially similar to the mapping file 224 created in block 512, except that it is located on the controller cache 210 instead of on the spare electronic storage device 220. The drive update method 500 then proceeds to step 702 of FIG. 7.

Figure 6:
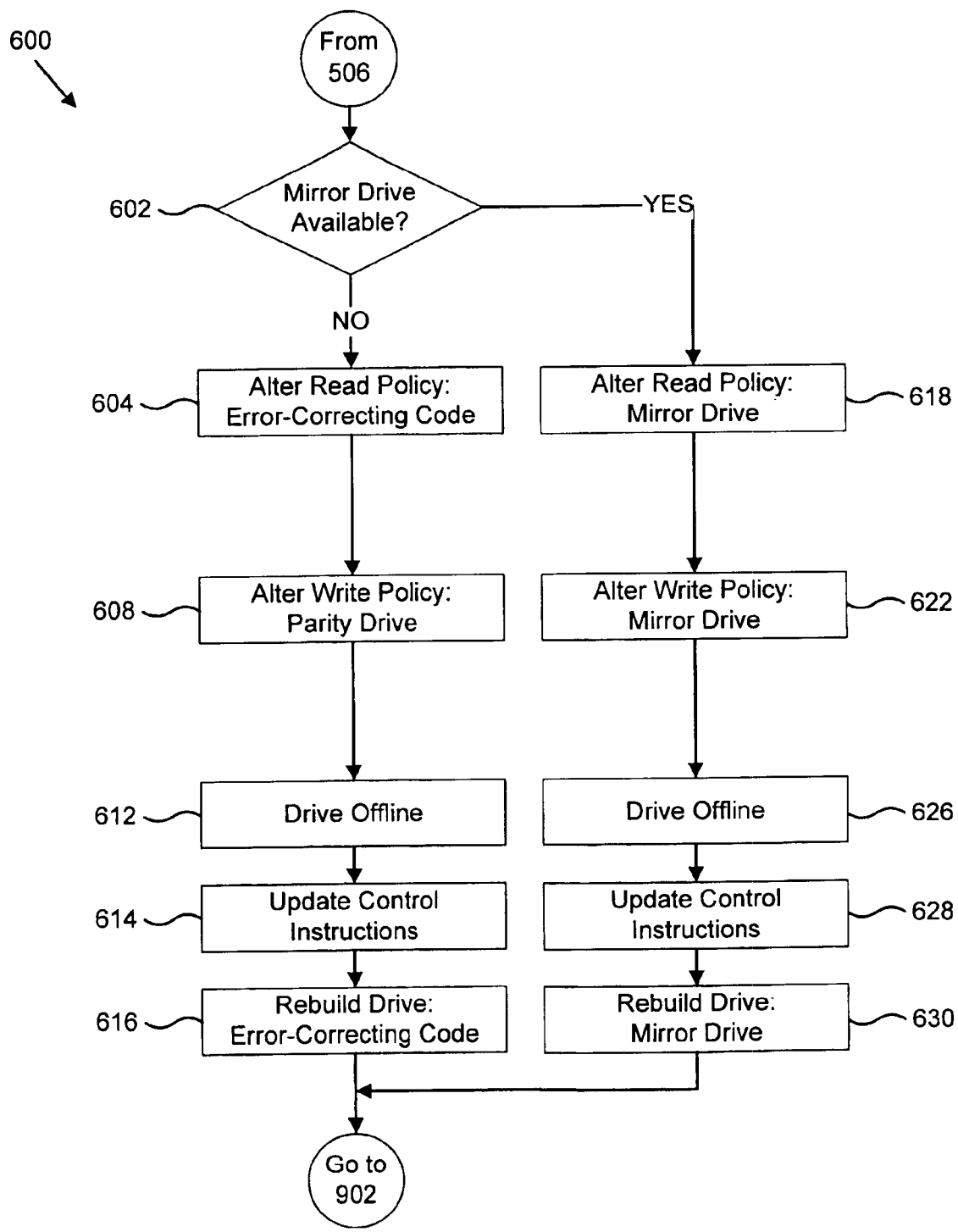
FIG. 6 is a continuation of the schematic flow chart diagram of FIG. 5 illustrating a specific example of the method of FIG. 4.

FIG. 6 represents a drive update method continuation 600, which is a continuation of the drive update method 500 represented in the schematic flow chart diagram of FIG. 5. The steps represented in the drive update method continuation 600 specifically deal with an instance in which it has been determined that neither the spare electronic storage devices 220 nor the controller cache 210 is available.

The drive update method continuation 600 determines the availability of mirror electronic storage devices 218, as shown at a block 602. If it is determined in decision block 602 that the mirror electronic storage devices 218 are not available, as in a RAID 3 or RAID 5 array structure, then the drive update method 600 continues with a block 604, which alters the read policy 301a of the storage system controller 202. The read policy 301a is altered so that the storage system controller 202 processes a read operation command from the host server 104 by regenerating the requested data from the parity drives within the electronic storage array 204 using error-correcting code. The storage system controller does not read data directly from the primary electronic storage device 216.

Next, the drive update method continuation 600 proceeds with a block 608, which represents an alteration of the write policy 301a of the storage system controller 202 so that the storage system controller 202 processes a write operation command from the host server 104 by writing the appropriate parity code to the parity drives within the electronic storage array 204. The storage system controller generally does not write data directly to the primary electronic storage device 216.

The read policy alteration of block 604 and the write policy alteration of block 608 allow the drive update module continuation 600 to take the primary electronic storage device 216 off-line, as shown at a block 612, so that it cannot be accessed by the storage system controller 202 for read or write operations initiated by the host server 104. Once the primary electronic storage device 216 is off-line, the update of the control instructions 222 in the primary electronic storage device 216 takes place, as shown at a block 614.

After the control instructions 222 are updated, the drive update method continuation 600 proceeds to rebuild all of the data on the primary electronic storage device 216, as shown at a block 616, using error-correcting code and data from the parity drives within the electronic storage array 204. In this step at block 616, all of the sectors on the primary electronic storage device 216 are rebuilt. Following the drive rebuild, the drive update method continuation 600 then proceeds to step 902 of FIG. 9.

If it is determined in decision block 602 that the mirror electronic storage devices 218 are available, as in a RAID 1 or RAID 1+0 array structure, then the drive update method continuation 600 proceeds with a block 618, which alters the read policy 301a of the storage system controller 202. The read policy 301a is altered so that the storage system controller 202 processes a read operation command from the host server 104 by accessing the mirror electronic storage device 218 within the electronic storage array 204 instead of reading data directly from the primary electronic storage device 216.

Subsequently, the drive update method continuation 600 proceeds with a block 622, which alters the write policy 301b of the storage system controller 202. The write policy 301b is altered so that the storage system controller 202 processes a write operation command from the host server 104 by writing the data to the mirror electronic storage device 216 instead of writing the data directly to the primary electronic storage device 216.

The read policy alteration of block 618 and the write policy alteration of block 622 allow the drive update module continuation 600 to take the primary electronic storage device 216 off-line, as shown at a block 626. The step of block 626 is preferably substantially similar to the step of block 612. Once the primary electronic storage device 216 is off-line, the update of the control instructions 222 in the primary electronic storage device 216 takes place, as shown at a block 628. The step of the block 628 is preferably substantially similar to the step of block 614.

After the control instructions 222 are updated, the drive update method continuation 600 proceeds to rebuild all of the data on the primary electronic storage device 216, as indicated at a block 630, by copying all of the data on the mirror electronic storage device 218 to the primary electronic storage device 216. In the step of block 630, all of the sectors on the primary electronic storage device 216 are rebuilt. Following the drive rebuild, the drive update method continuation 600 proceeds to step 902 of FIG. 9.

Figure 7:
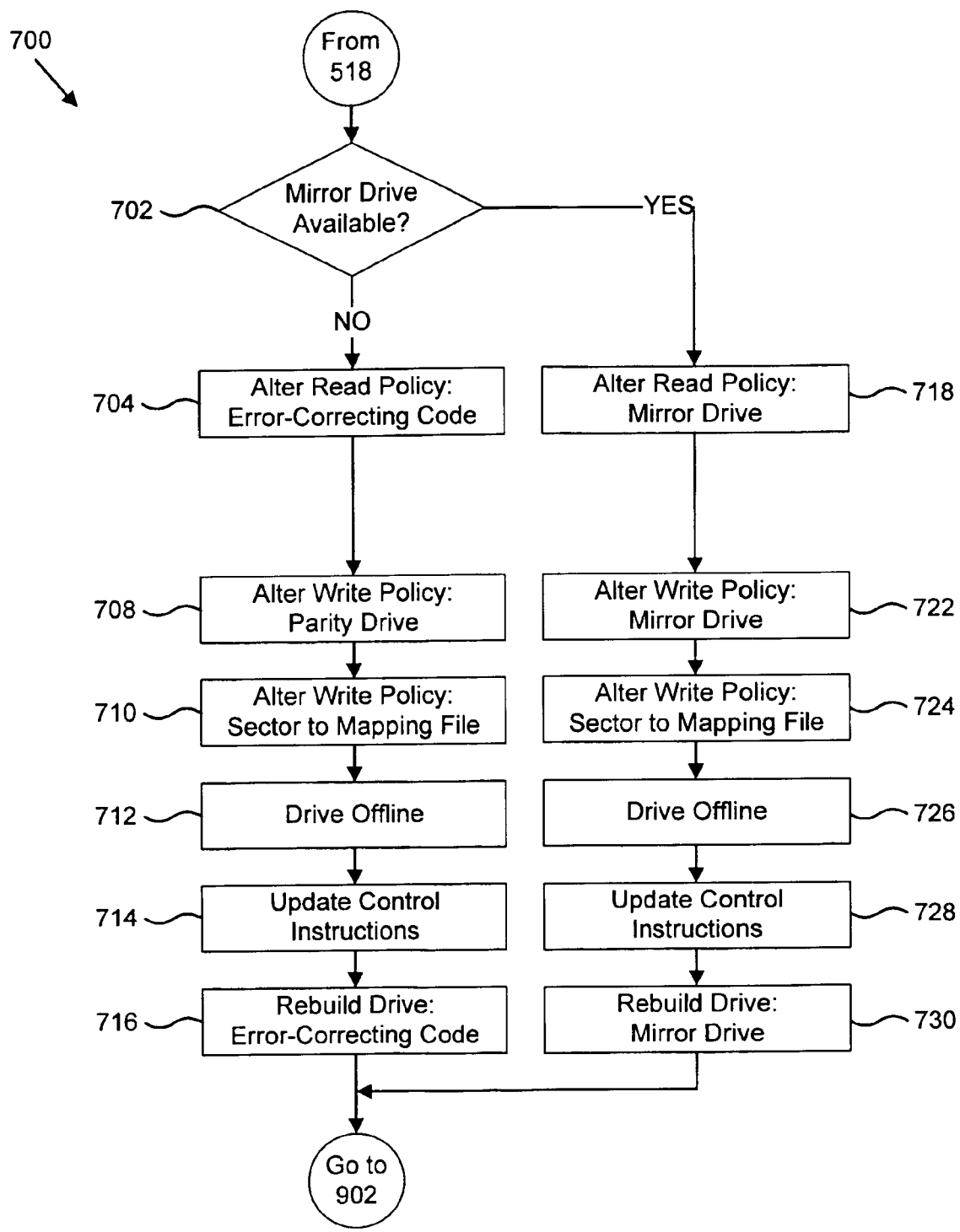
FIG. 7 is a continuation of the schematic flow chart diagram of FIG. 5 illustrating a specific example of the method of FIG. 4.

FIG. 7 represents a drive update method continuation 700 that is a continuation of the drive update method 500 represented in the schematic flow chart diagram of FIG. 5. The steps represented in drive update method continuation 700 specifically deal with an instance in which it has been determined that the spare electronic storage devices 220 are not available and the host server 104 cache is available.

The drive update method 700 determines the availability of mirror electronic storage devices 218, as shown at a block 702. If it is determined at decision block 702 that the mirror electronic storage devices 218 are not available, as in a RAID 3 or RAID 5 array structure, then the drive update method continuation 700 proceeds with a block 704, which alters the read policy 301a of the storage system controller 202. The step of block 704 is preferably substantially similar to the step of block 604.

Next, the drive update method continuation 700 proceeds with a block 708, which alters the write policy 301b of the storage system controller 202. The step of block 708 is preferably substantially similar to the step of block 608. Additionally, as shown at a block 710, the write policy 301b is altered to map the sector of the primary electronic storage device 216 from which write operation data is diverted. The sector is mapped in the mapping file 213 created on the controller cache 210, as indicated at a block 518.

The read policy alteration of block 704 and the write policy alteration of blocks 708 and 710 allow the drive update module continuation 700 to take the primary electronic storage device 216 off-line, as indicated in a block 712. The step of block 712 is preferably substantially similar to the step of block 612. Once the primary electronic storage device 216 is off-line, the update of the control instructions 222 in the primary electronic storage device 216 takes place, as shown at a block 714. The step of block 714 is preferably substantially similar to the step of block 614.

After the control instructions 222 are updated, the drive update method continuation 700 proceeds to rebuild the data on the sectors of the primary electronic storage device 216, as shown at a block 716, corresponding to the primary electronic storage device 216 sectors mapped in the mapping file 213, as indicated in block 710. The rebuild is preferably conducted using error-correcting code and the data from the parity drives within the electronic storage array 204. In this step of block 716, only the sectors of the primary electronic storage device 216 which are mapped in the mapping file 213 are rebuilt. Following the drive rebuild, the drive update method continuation 700 proceeds to step 902 of FIG. 9.

If it is determined in decision block 702 that the mirror electronic storage devices 218 are available, as in a RAID 1 or RAID 1+0 array structure, the drive update method continuation 700 proceeds as indicated at a block 718, by altering the read policy 301a of the storage system controller 202. The step of block 718 is preferably substantially similar to the step of block 618.

Next, the drive update method continuation 700 proceeds with a block 722, which represents altering the write policy 301b of the storage system controller 202. The step of blocks 722 is preferably substantially similar to the step of block 622. Additionally, as shown at a block 724, the write policy 301b is altered to map the sector of the primary electronic storage device 216 from which write operation data is diverted. The sector is mapped in the mapping file 213 created on the controller cache 210, as indicated in block 518.

The read policy alteration of block 718 and the write policy alteration of blocks 722 and 724, allow the drive update module continuation 700 to take the primary electronic storage device 216 off-line, as shown at a block 726. The step of block 726 is preferably substantially similar to the step of block 612. Once the primary electronic storage device 216 is off-line, the update of the control instructions 222 in the primary electronic storage device 216 takes place, as shown at a block 728. The step of block 728 is preferably substantially similar to the step of block 614.

After the control instructions 222 are updated, the drive update method continuation 700 proceeds to rebuild the data on the sectors of the primary electronic storage device 216. The sectors correspond to the primary electronic storage device 216 sectors mapped in the mapping file 213, as indicated at block 724. The rebuild proceeds by copying the data on the mapped mirror electronic storage device 218 sectors to the corresponding primary electronic storage device 216 sectors, as indicated at a block 730. In this step of block 730, only the sectors of the primary electronic storage device 216 that are mapped in the mapping file 213 are rebuilt. Following the drive rebuild, the drive update method continuation 700 then proceeds to step 902 of FIG. 9.

Figure 8:
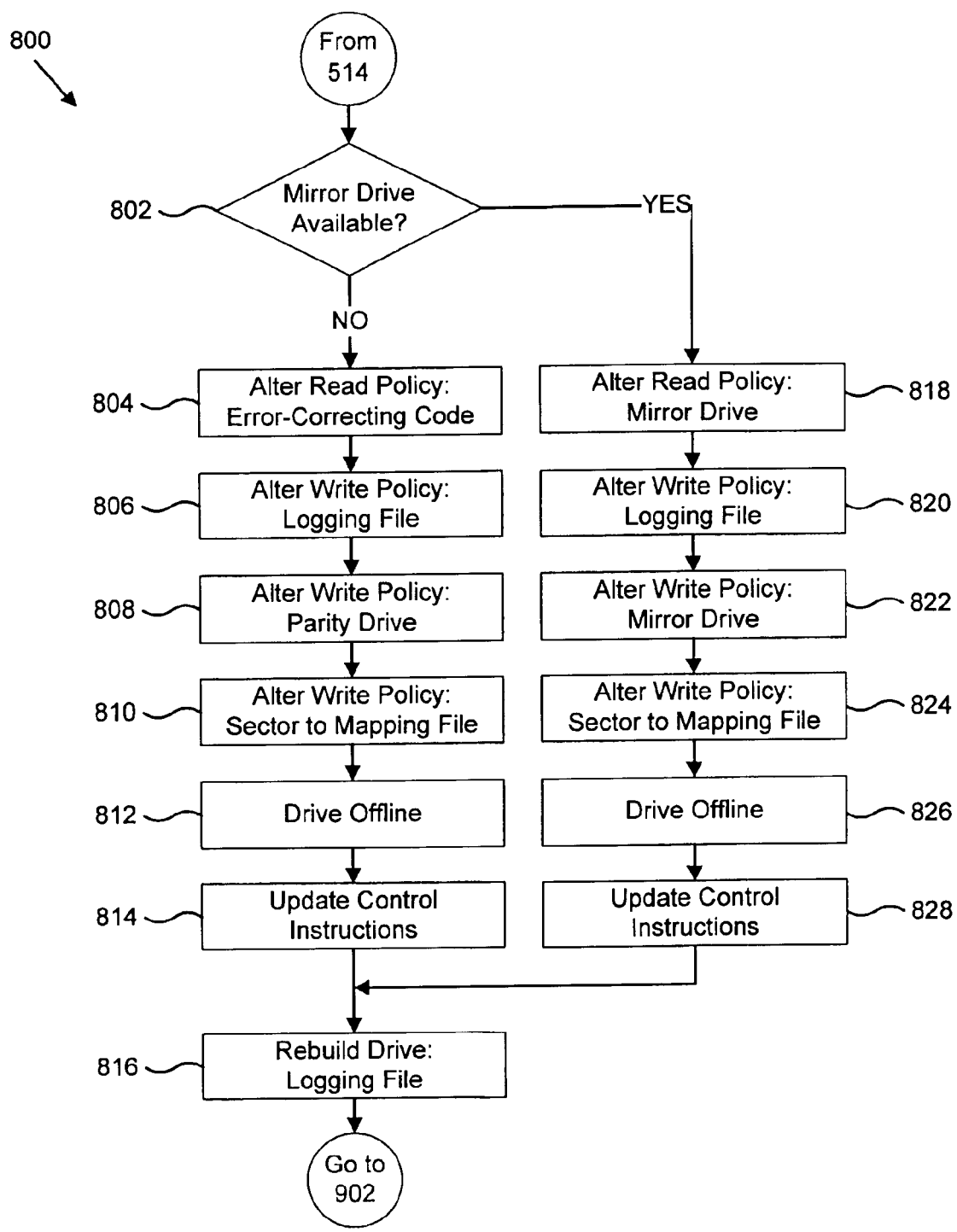
FIG. 8 is a continuation of the schematic flow chart diagram of FIG. 5 illustrating a specific example of the method of FIG. 4.

FIG. 8 represents a drive update method continuation 800, which is a continuation of the drive update method 500 represented in the schematic flow chart diagram of FIG. 5. The steps represented in drive update method continuation 800 specifically deal with an instance in which it has been determined that the spare electronic storage devices 220 are available.

The drive update method continuation 800 determines the availability of mirror electronic storage devices 218, as shown at a decision block 802. If it is determined at decision block 802 that the mirror electronic storage devices 218 are not available, as in a RAID 3 or RAID 5 array structure, then the drive update method continuation 800 proceeds with a block 804, at which the read policy 301a of the storage system controller 202 is altered. The step of block 804 is preferably substantially similar to the step of block 604.

Next, the drive update method continuation 800 continues with a block 806, at which alters the write policy 301b of the storage system controller 202 is altered. The write policy 301b is altered so that the storage system controller 202 processes a write operation command from the host server 104 by writing the data to the logging file 226 created on the spare electronic storage device 220, as indicated in block 514, instead of writing the data directly to the primary electronic storage device 216. The write policy 301b is further altered, as indicated at a block 808, in a manner that is substantially similar to the step of block 608. Additionally, as shown at a block 810, the write policy 301b is altered to map the sector of the primary electronic storage device 216 from which write operation data is diverted. The sector is mapped in the mapping file 224 created on the spare electronic storage device 220, as indicated at block 512.

The read policy alteration of block 804 and the write policy alteration of blocks 806, 808, and 810 allow the drive update module 800 to take the primary electronic storage device 216 off-line, as shown at a block 812. The step of block 812 is preferably substantially similar to the step of block 612. Once the primary electronic storage device 216 is off-line, the update of the control instructions 222 in the primary electronic storage device 216 takes place, as shown at a block 814. The step of block 814 is preferably substantially similar to the step of block 614.

After the control instructions 222 are updated, the drive update method continuation 800 proceeds to rebuild the data on the sectors of the primary electronic storage device 216, as shown at a block 816, corresponding to the primary electronic storage device 216 sectors mapped in the mapping file 224, as indicated at block 810, by copying the data in the logging file 226, as indicated at block 514, to the corresponding mapped primary electronic storage device 216 sectors. In this step of block 816, only the sectors of the primary electronic storage device 216 which are mapped in the mapping file 224 are rebuilt. Following the drive rebuild, the drive update method continuation 800 then proceeds to step 902 of FIG. 9.

If it is determined in decision block 802 that the mirror electronic storage devices 218 are available, as in a RAID 1 or RAID 1+0 array structure, then the drive update method continuation 800 proceeds with a block 818, which alters the read policy 301 a of the storage system controller 202. The step of block 818 is substantially similar to the step of block 618.

Next, the drive update method continuation 800 proceeds with a block 820 and a block 822, which alter the write policy 301b of the storage system controller 202. The steps of blocks 820 and 822 are preferably substantially similar to the steps of blocks 806 and 622, respectively. Additionally, as shown at a block 824, the write policy 301b is altered to map the sector of the primary electronic storage device 216 from which write operation data is diverted. The sector is mapped in the mapping file 224 created on the spare electronic storage device 220, as indicated at block 512. The step of block 824 is substantially similar to the step of block 810.

The read policy alteration of block 818 and the write policy alteration of blocks 820, 822, and 824 allow the drive update module continuation 800 to take the primary electronic storage device 216 off-line, as shown at a block 826. The step of block 826 is preferably substantially similar to the step of block 612. Once the primary electronic storage device 216 is off-line, the update of the control instructions 222 in the primary electronic storage device 216 takes place, as shown at a block 828. The step of block 828 is preferably substantially similar to the step of block 614.

After the control instructions 222 are updated, the drive update method continuation 800 proceeds to rebuild the data on the sectors of the primary electronic storage device 216, as shown at the previously described block 816. Following the drive rebuild, the drive update method continuation 800 proceeds to step 902 of FIG. 9.

Figure 9:
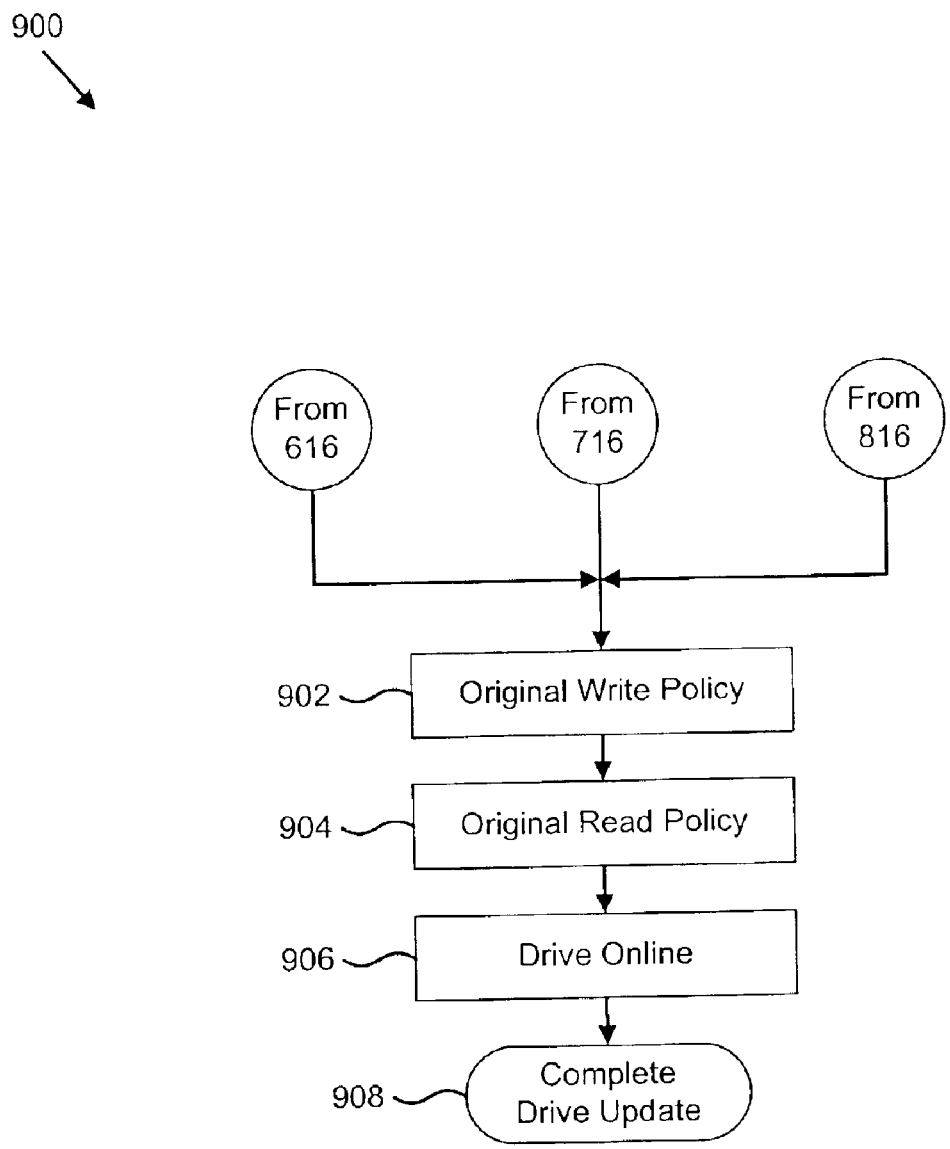
FIG. 9 is a continuation of the schematic flow chart diagram of FIG. 5 illustrating a specific example of the method of FIG. 4.

FIG. 9 represents a drive update method continuation 900, which is a continuation of the drive update method 500 represented in the schematic flow chart diagram of FIG. 5. The steps represented in drive update method continuation 900 specifically deal with the final steps after the control instructions 222 in the primary electronic storage device 216 have been updated and the primary electronic storage device 216 has been rebuilt.

Following the primary electronic storage device 216 rebuild process of blocks 616, 630, 716, 730, or 816, the drive update method continuation 900 restores the original write policy 301b of the storage system controller 202, as shown at a block 902, and restores the original read policy 301a of the storage system controller 202, as shown at a block 904.

At this point, the primary electronic storage device 216 is put on-line, as shown at a block 906, so that it can be accessed by the storage system controller 202 for read or write operations initiated by the host server 104. Finally, the drive update method continuation 900, as well as the overall drive update process 500, is terminated upon completion of the drive update process, as shown at a block 908.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for updating control instructions in an electronic storage device of a distributed data storage system including a storage system controller, a primary electronic storage device, and a temporary electronic storage device, the method comprising:

diverting write operation data originally directed to the primary electronic storage device;

generating at least a partial mapping file of the write operation data diverted from the primary electronic storage device;

updating control instructions in the primary electronic storage device while the write operation data is being diverted; and rebuilding at least the diverted write operation data on the primary electronic storage device, comprising:
  copying data written to a mirror electronic storage device from the mirror electronic storage device to the primary electronic storage device;
  copying data written to a logging file on the temporary electronic storage device from the logging file to the corresponding primary electronic storage device sectors mapped in the mapping file, if the mirror electronic storage device is not available; and
  regenerating write data on the primary electronic storage device at the primary electronic storage device sectors mapped in the mapping file, if the mirror electronic storage device and the logging file are not available.

2. The method of claim 1, wherein the write operation data comprises at least a primary electronic storage device sector.

3. The method of claim 1, further comprising determining spare electronic storage device availability.

4. The method of claim 1, further comprising updating the control instructions on any available spare electronic storage device.

5. The method of claim 1, further comprising designating the temporary electronic storage device, comprising:

designating a spare electronic storage device as the temporary electronic storage device; and designating a controller cache as the temporary electronic storage device, if a spare electronic storage device is not available.

6. The method of claim 1, further comprising determining mirror electronic storage device availability.

7. The method of claim 1, further comprising altering the read policy of the distributed data storage system during the control instruction update of the primary electronic storage device, comprising:

reading requested data from a mirror electronic storage device;

reading requested data from a logging file on the temporary electronic storage device; and regenerating requested read data from parity drives using error-correcting codes, if the mirror and temporary electronic storage devices are not available.

8. The method of claim 1, wherein diverting write operation data further comprises altering the write policy of the distributed data storage system during the update of the control instructions in the primary electronic storage device, including mapping a primary electronic storage device write sector in the mapping file on the temporary electronic storage device.

9. The method of claim 8, further comprising writing data to a logging file on the temporary electronic storage device.

10. The method of claim 1, further comprising writing data to a mirror electronic storage device.

11. The method of claim 1, wherein updating of control instructions in the primary electronic storage device further comprises allowing normal read and write operations to occur during the control instructions update period.

12. A method for updating control instructions in an electronic storage device of a distributed data storage system including at storage system controller and a primary electronic storage device, the method comprising:

determining spare drive availability;
designating a temporary electronic storage device;
determining mirror drive availability;
altering the read policy of the distributed data storage system to allow normal read operations to occur during the control instructions update period;
altering the write policy of the distributed data storage system to allow normal write operations to occur during the control instructions update period;
restricting host system access to the primary electronic storage device;
updating the control instructions in the primary electronic storage device while the read and write policies are altered;
rebuilding write operation data on the primary electronic storage device, wherein rebuilding comprises:
copying data written to a mirror electronic storage device from the mirror electronic storage device to the primary electronic storage device;
copying data written to a logging file on the temporary electronic storage device from the logging file to the corresponding primary electronic storage device sectors mapped in the mapping file, if the mirror electronic storage device is not available; and
regenerating write data on the primary electronic storage device at the primary electronic storage device sectors mapped in the mapping file, if the mirror electronic storage device and the logging file are not available; and restoring host system access to the primary electronic storage device.

13. A drive update module for use in a storage system controller, the drive update module capable of updating control instructions in a primary electronic storage device and configured to update control instructions in an electronic storage device within a distributed data storage system, the drive update module comprising:

a write policy alteration module configured to divert write operation data directed to the primary electronic storage device;
a mapping module configured to generate at least a partial mapping file of the write operation data diverted from the primary electronic storage device; and
a control instructions update module configured to update the control instructions in the primary electronic storage device; and
a drive rebuild module configured to rebuild at least diverted write operation data on the primary electronic storage device, the drive rebuild module comprising:
a mirror drive rebuild module configured to copy data written to a mirror electronic storage device from the mirror electronic storage device to the primary electronic storage device;
a logging file rebuild module configured to copy data written to a logging file on the temporary electronic storage device from the logging file to the corresponding primary electronic storage device sectors mapped in the mapping file, if the mirror electronic storage device is not available; and
a regeneration rebuild module configured to regenerate write data on the primary electronic storage device at the primary electronic storage device sectors mapped in the mapping file, if the mirror electronic storage device and the logging file are not available.

14. The drive update module of claim 13, further comprising a drive update initiation module configured to initiate a control instructions update in the primary electronic storage device.

15. The drive update module of claim 13, further comprising a spare drive availability module configured to determine spare electronic storage device availability.

16. The drive update module of claim 13, further comprising a spare drive update module configured to update the control instructions in a spare electronic storage device.

17. The drive update module of claim 13, further comprising a temporary storage designation module configured to designate a temporary electronic storage device, the temporary storage designation module comprising:

a spare drive designation module configured to designate a spare electronic storage device as the temporary electronic storage device; and
a controller cache designation module configured to designate a controller cache as the temporary electronic storage device, if a spare electronic storage device is not available.

18. The drive update module of claim 13, further comprising a mirror drive availability module configured to determine mirror electronic storage device availability.

19. The drive update module of claim 13, further comprising a read policy alteration module configured to alter the read policy of the distributed data storage system during the control instructions update in the primary electronic storage device, the read alteration module comprising:

a mirror drive read module configured to read requested data from a mirror electronic storage device;
a logging file read module configured to read requested data from a logging file on a temporary electronic storage device, if the mirror electronic storage device is not available; and
a regeneration read module configured to regenerate requested read data from parity drives using error-correcting codes, if the mirror and temporary electronic storage devices are not available.

20. The drive update module of claim 13, further comprising a mapping module configured to map the upgrade drive write sector in a mapping file on a temporary electronic storage device.

21. The drive update module of claim 13, wherein the write policy alteration module further comprises a logging file write module configured to write data to a logging file on a temporary electronic storage device.

22. The drive update module of claim 13, wherein the write policy alteration module further comprises a mirror drive write module configured to write data to a mirror electronic storage device.

23. The drive update module of claim 13, wherein the control instruction update module is configured to allow normal read and write operations to occur during the control instructions update period.

24. The drive update module of claim 13, further comprising a drive update completion module configured to complete a control instructions update in the primary electronic storage device.

25. A distributed data storage system having a capability to be updated, the distributed data storage system comprising:

a primary electronic storage device;

a storage system controller;

a temporary electronic storage device;

a write policy alteration module configured to divert write operation data directed to the primary electronic storage device;

a mapping module configured to generate at least a partial mapping file of the write operation data diverted from the primary electronic storage device; and a control instructions update module configured to update the control instructions in the primary electronic storage device.

a drive rebuild module configured to rebuild at least diverted write operation data on the primary electronic storage device, the drive rebuild module comprising:

a mirror drive rebuild module configured to copy data written to a mirror electronic storage device from the mirror electronic storage device to the primary electronic storage device;

a logging file rebuild module configured to copy data written to a logging file on the temporary electronic storage device from the logging file to the corresponding primary electronic storage device sectors mapped in the mapping file, if the mirror electronic storage device is not available; and a regeneration rebuild module configured to regenerate write data on the primary electronic storage device at the primary electronic storage device sectors mapped in the mapping file, if the mirror electronic storage device and the logging file are not available.

26. A distributed data storage device comprising:

a primary electronic storage device; and a storage system controller comprising:

means for diverting write operation data originally directed to the primary electronic storage device;

means for generating at least a partial mapping file of the write operation data diverted from the primary electronic storage device; and means for updating control instructions in the primary electronic storage device while the write operation data is being diverted; and means for rebuilding at least the diverted write operation data on the primary electronic storage device, comprising:

means for copying data written to a mirror electronic storage device from the mirror electronic storage device to the primary electronic storage device;

means for copying data written to a logging file on the temporary electronic storage device from the logging file to the corresponding primary electronic storage device sectors mapped in the mapping file, if the mirror electronic storage device is not available; and means for regenerating write data on the primary electronic storage device at the primary electronic storage device sectors mapped in the mapping file, if the mirror electronic storage device and the logging file are not available.

* * * * *